(12) United States Patent
Huoviala et al.

(10) Patent No.: US 8,250,091 B2
(45) Date of Patent: Aug. 21, 2012

(54) ACCESS REQUEST MANAGEMENT

(75) Inventors: Rauno Huoviala, Helsinki (FI); Niclas Svahnström, Helsinki (FI)

(73) Assignee: Teliasonera AB, Stockholm (SE)

( * ) Notice: Subject to any disclaimer, the term of this patent is extended or adjusted under 35 U.S.C. 154(b) by 336 days.

(21) Appl. No.: 12/733,829

(22) PCT Filed: Sep. 24, 2008

(86) PCT No.: PCT/FI2008/050526
§ 371 (c)(1),
(2), (4) Date: Mar. 23, 2010

(87) PCT Pub. No.: WO2009/040467
PCT Pub. Date: Apr. 2, 2009

(65) Prior Publication Data
US 2010/0211597 A1 Aug. 19, 2010

(30) Foreign Application Priority Data

Sep. 25, 2007 (FI) ..................................... 20075667

(51) Int. Cl.
*G06F 17/30* (2006.01)
(52) U.S. Cl. ........................ 707/769; 709/203
(58) Field of Classification Search .................. 707/769; 709/203
See application file for complete search history.

(56) References Cited

U.S. PATENT DOCUMENTS

| | | | |
|---|---|---|---|
| 5,991,810 A * | 11/1999 | Shapiro et al. .............. | 709/229 |
| 6,317,792 B1 | 11/2001 | Mundy et al. | |
| 7,099,917 B2 * | 8/2006 | Luna et al. .................. | 709/203 |
| 7,263,549 B2 * | 8/2007 | Yoshimoto .................... | 709/218 |
| 2003/0074443 A1 | 4/2003 | Melaku | |
| 2003/0100308 A1 | 5/2003 | Rusch | |
| 2005/0197156 A1 | 9/2005 | Fourquin et al. | |
| 2006/0026286 A1 * | 2/2006 | Lei et al. ...................... | 709/227 |
| 2009/0158402 A1 * | 6/2009 | Ding ............................... | 726/4 |
| 2010/0064045 A1 * | 3/2010 | Jalkanen et al. ............. | 709/227 |

FOREIGN PATENT DOCUMENTS

| | | |
|---|---|---|
| EP | 1 531 646 A1 | 5/2005 |
| GB | 2 346 507 A | 8/2009 |
| JP | 11177727 | 7/1999 |
| WO | WO 94/28683 | 12/1994 |
| WO | WO 95/17077 | 6/1995 |
| WO | WO 02/30133 A2 | 4/2002 |
| WO | WO 03/047177 A1 | 6/2003 |
| WO | WO 2004/014098 A1 | 2/2004 |
| WO | WO 2004/031488 A1 | 4/2004 |
| WO | WO 2004/047476 A1 | 6/2004 |
| WO | WO 2006/004784 A1 | 1/2006 |

OTHER PUBLICATIONS

GSM Association: IPX White Paper, Internet Citation, pp. 1-49, XP002598701, Mar. 22, 2007.
GSM Association: GSM Association Official Document IR. 34, Inter-Service Provider IP Backbone Guildelines, Jan. 31, 2007, pp. 1-45, Jan. 31, 2007.
EP Search Report, Application No. 11182082.5, Mar. 11, 2011.

* cited by examiner

*Primary Examiner* — Cheryl Lewis
(74) *Attorney, Agent, or Firm* — Cozen O'Connor

(57) ABSTRACT

A method for managing an request on a communication resource for a user terminal. In the method for an access request access request settings that comprise a user-specific set of one or more selection criteria for determining applicability of a communication resource for the re-quested access are determined. Communication resources are queried from a group of access nodes; and the determined access request settings are in selecting the communication resource for the access.

21 Claims, 3 Drawing Sheets

ACCESS REQUEST MANAGEMENT

PRIORITY CLAIM

This is the U.S. national stage of application No. PCT/FI2008/050526, filed on 24 Sep. 2008. Priority is claimed from Country Patent Application No. 20075667, filed 25 Sep. 2007, the content of which is incorporated herewith by reference.

FIELD OF THE INVENTION

The present invention relates to telecommunications, and more particularly to managing access requests on communication resources for user terminals.

BACKGROUND OF THE INVENTION

Term access refers to a capability to obtain or make use of or take advantage of something. In communications, access typically refers to the right to obtain or make use of or take advantage of a communication resource. Such communication resource may be, for example, a physical or logical communication channel, or a service provided by a service provider.

The roles and responsibilities in communications have conventionally been divided to subscribers, operators, network providers, service providers, and the like. However, due to the evolving new technologies, these conventional roles and responsibilities are undergoing a change. Conventionally, a subscriber has been defined as user of a telecommunication service, based on a contract with the service provider. Additionally, telecommunications companies have made agreements to apply roaming such that user terminals registered in their user registers may be used in both networks. People move and travel more and more, but due to this agreement-based operation models, the users of communication services have been encumbered to static configurations of operators and prices contractually agreed between them.

Due to the rapid development, user terminals of today typically include more than one communication interface such that they are able to communicate over different access networks. This increases the potential for roaming significantly, because a particular communication need or a service could be implemented though various accesses networks and interfaces. However, it is very difficult and laborious to identify and go though the various access alternatives and quickly decide the best one for the current communication need.

SUMMARY OF THE INVENTION

An object of the present invention is thus to provide a method and an apparatus for implementing the method so as to overcome the above problem. The objects of the invention are achieved by a method and an arrangement, which are characterized by what is stated in the independent claims. The preferred embodiments of the invention are disclosed in the dependent claims.

The invention is based on the idea of arranging to the communication system an entity that detects an activated access request for a service, and on the basis of that generates a group of one or more The access resource search criteria. The criteria are forwarded to a network node that on the basis of the search criteria determines applicable access types and accessible communication resources of those access types that would be able to fulfil the criteria. From these determined communication resources, a communication resource for the requested access is selected on the basis of an algorithm that is dynamically adjustable for each user.

An advantage of the method and arrangement of the invention is that the user may be dynamically provided a communication resource that fulfils the current communication need and at the same is most feasible to him or her. The user does not need to be aware of the techno-economical dependencies between the user-specific preferences and characteristics of different access types.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The following embodiments are exemplary implementations of the present invention. Although the specification may refer to "an", "one", or "some" embodiment(s), reference is not necessarily made to the same embodiment(s), and/or a feature does not apply to a single embodiment only. Single features of different embodiments of this specification may be combined to provide further embodiments.

In the following, the invention is described using the terms and elements of the IPX (IP Exchange) network without, however, limiting the invention to this one communication system technology. The present invention can be applied to any communication system where access to a communication services is implemented by communication resources of variable configuration.

Figure 1:
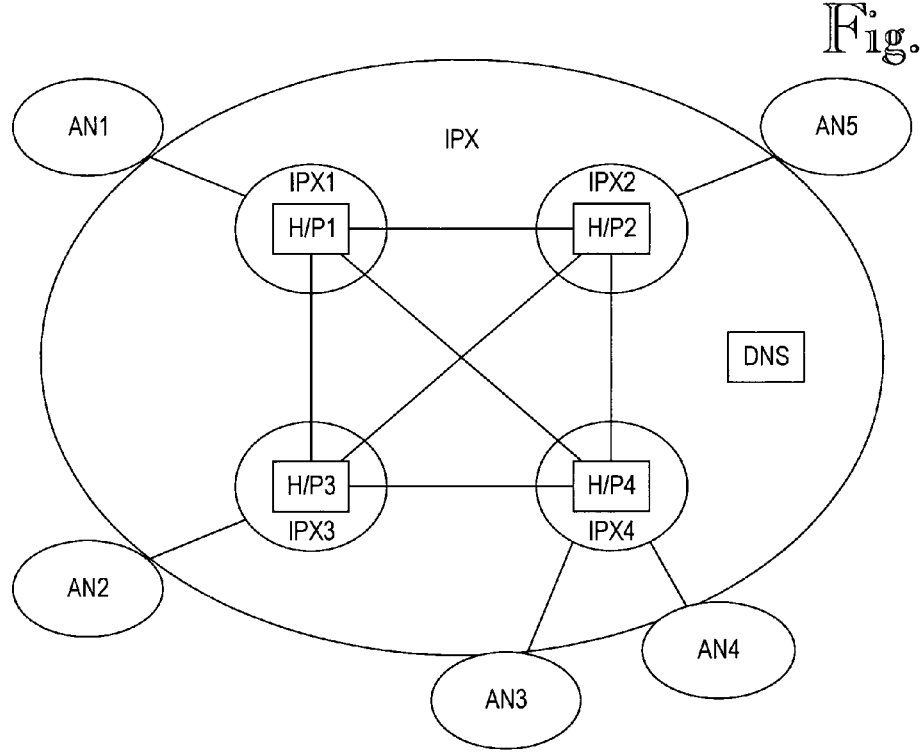
FIG. 1 illustrates the main elements of an embodied communication system.

FIG. 1 shows a simplified illustration of the main elements of an embodied communication system. FIG. 1 shows a number of access networks AN1, AN2, AN3, AN4, AN5. Access network represents here a communication entity that provides a point of entry or means of entry to a particular group of communication resources.

Typically an access network is a separately operated network of one access technology. Separate operation relates herein to technical characteristics of the access network. One operator may own more than two networks, and these two networks may share some elements, for example application servers. However, if two networks allow assignment of communication resources independently of each other, they may be considered separately operated networks. In the following, access networks and operators of such separately operated access networks will be described as separate entities, notwithstanding the commercial aspects of the operation or the possibly shared network resources between two or more access networks.

Different networks may overlap such that a user terminal residing in a particular location may be able to interface more than one access networks. Presently a subscriber using a user terminal has a service level agreement with a selected operator and accesses a corresponding home network provided by the operator whenever it is available. For the situations when the home network is not available, the operator has negotiated roaming agreements such that the user terminal may be provided access in another network called visited network. The visited network may provide similar access as the home network or provide access through some other communication interface.

An example of the first case is roaming between cellular networks when moving from one country to another. As an example of the second case, a subscriber may carry a user terminal that provides radio interface to a GSM (Global System for Mobile communication) network and to a 3G network. The user terminal may be configured such that it accesses a particular 3G network always when 3G coverage is available; otherwise the GSM interface is used. In both cases, the selection of the access network follows a predefined order and roaming between networks is arranged by means of substantially static roaming contracts between operators.

However, such setups are expected to disappear; user terminals are expected to provide a variety of access interfaces and users become more and more conscious of the communication costs. Therefore competition between access networks, with similar and different access interfaces, becomes dynamic and a user with a particular need for communication resource wishes to freely search the resource and select one that meets his or her current preferences.

Each of the access networks is connected to at least one IPX (IP Exchange) backbone network IPX1, IPX2, IPX3, IPX4. Mutually interconnected IPX backbone networks IPX1, IPX2, IPX3, IPX4 and related supplementary elements (for example for domain name service DNS) form an IPX network that connects different communities of operators and communication service providers together. For security reasons, IPX is advantageously a closed network whose routing, addressing and domain name services are separated from public networks (e.g. Internet).

IPX backbone networks IPX1, IPX2, IPX3, IPX4 are typically WAN (Wide Area Network) networks whose infrastructures comprise backbone type cabling for broadband traffic, repeater elements and routers, interconnected in a manner well known to a person skilled in the art. IPX network provides two connection models. In a direct connection traffic is routed over the IPX network using a bilateral connection between two access networks. For non-direct connections an IPX backbone network IPX1, IPX2, IPX3, IPX4 comprises a network node H/P1, H/P2, H/P3, H/P4 that operates as a hub/proxy for multilateral connections to two or more access networks. Depending of the application, access networks can use either of the models in their communication via the IPX network.

Figure 2A:
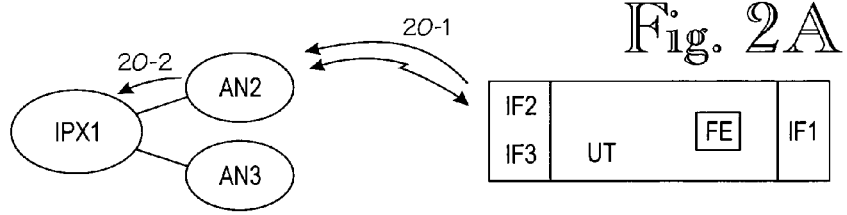
FIGS. 2A to 2C show schematics for exemplary architectures in the communication system of FIG. 1.
Figure 2B:
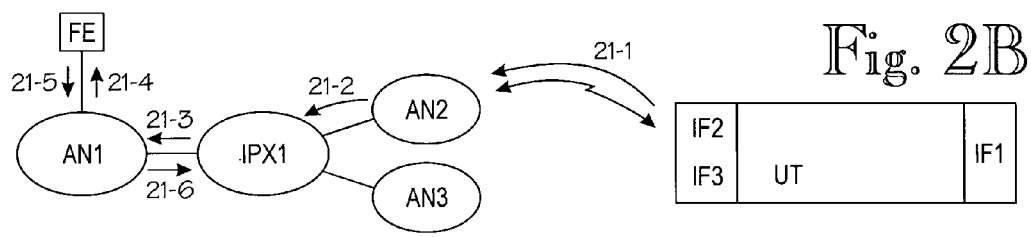
Figure 2C:
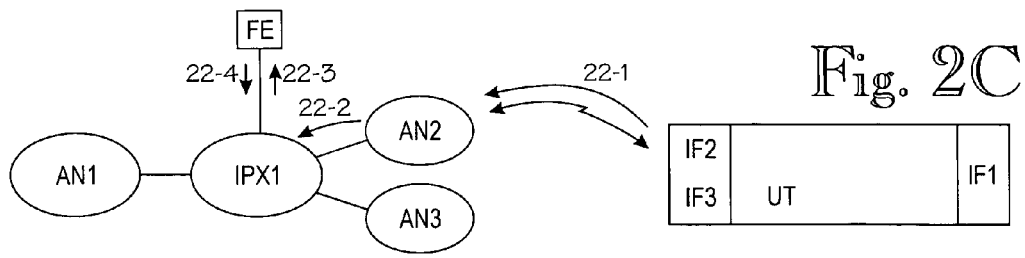

FIGS. 2A to 2C show schematics for exemplary architectures in the communication system of FIG. 1 where an embodiment of the present invention may be applied. All these figures show a network node IPX1 that is configured to operate as an IPX proxy/hub to IPX network for access networks AN1, AN2, AN3. In the following this network node is referred to as the current IPX proxy. The current IPX proxy is comprised in an IPX backbone to which access networks AN1, AN2 and AN3 are connected. FIGS. 2A to 2C show also a user terminal UT that comprises one or more communication interfaces IF1, IF2, IF3 via which a user of the user terminal can communicate with respective access networks AN1, AN2, AN3. Communication interfaces IF1, IF2, IF3 provide access to systems with similar of mutually different technologies. In the exemplary architecture of FIGS. 2A to 2C the user terminal is shown as a mobile terminal. It should be noted that the invention is not restricted to mobile terminals, but is applicable in user terminals with fixed interfaces, mobile interfaces or combination of both. When the user terminal enters the coverage area of an access network AN2, it may register to AN2 and thereby achieve ability to communicate with the IPX proxy. In case access networks AN2, AN3 overlap and the user terminal is capable of interfacing both, it may register to either one of them or both of them.

Each of the figures show also a functional element FE that detects or receives an access request, generates one or more user-specific search criteria to be used in searching a communication resource that corresponds to the access request, and provides this one or more search criteria to the IPX proxy. A search criterion represents here a condition or a rule which enables a choice, therefore upon which a decision or judgment on validity of the communication resource for the requested access can be based. A search criterion comprises a definition on at least one technical characteristic of the communication resource, for example a requirement for specific bandwidth, error correction type, particular requested feature or the like. In the following the group of one or more user-specific search criteria generated on the basis of a detected or received access request by the functional element are comprised in access request settings.

Access request settings generated by the functional element FE may also comprise one or more comparison criteria to be used to arrange the communication resources that were discovered with the search criteria dynamically into order of preference. A comparison criteria may define, for example, a preferred operator at particular geographic location, preference to select speed of connection over cost of connection, or preference to cheapest possible resource, and the like. The criteria will be discussed in more detail later in the description.

The functional element FE may be implemented in hardware (one or more devices), firmware (one or more devices), software (one or more modules), or combinations thereof. For a hardware implementation, the processing elements may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic elements designed to perform the functions described herein, or a combination thereof. For a firmware or software, implementation can be through modules (e.g., procedures, functions, and so on) that perform the functions described herein. The software codes may be stored in memory element and executed by the processing element. The memory element may be implemented within the processor or external to the processor, in which case it can be communicatively coupled to the processor via various means as is known in the art. Additionally, components of systems described herein may be rearranged and/or complemented by additional components in order to facilitate achieving the various aspects, goals, advantages, etc., described with regard thereto, and are not limited to the precise configurations set forth in FIGS. 2A to 2C, as will be appreciated by one skilled in the art.

In the embodiment of FIG. 2A the functional element is included in the user terminal. Here the access request settings are generated when a user activates a particular service, for example by clicking a corresponding menu icon in the user interface. The activation triggers operation of the functional element and causes the functional element to identify the requested service, and generate the corresponding access request settings. The access request settings may be accessed from an internal database in the user terminal, from the user through the user interface of the user terminal, or by signaling from an external source in the access network or in the IPX network or as a combination of two or more of these.

As an example, let us assume that the user activates through a terminal menu an icon for a specific streaming video service. First of all, such service poses defined technical requirements for the connection, for example, a requirement for minimum bandwidth. Advantageously such technical requirements are stored in the user terminal and retrieved automatically when the application is initiated in the user terminal. For some elementary services of the communication system the related technical criteria may also be inherent and need not be specifically included in the access request settings. For example, the protocol for access request messages may be configured such that the form of the message indicates whether the request concerns voice or video service. In such case a specific technical criterion for bandwidth is not necessarily needed in the access request settings anymore.

In this embodiment, a memory of the user terminal comprises definitions that associate a group of technical requirements to the requested streaming video service. The functional element retrieves these stored technical requirements and generates therefrom a set of technical search criteria. For example, these technical requirements may comprise a requirement for minimum bandwidth of 2 Megabytes. Thus a technical search criterion corresponding to an access request on streaming video service could be recorded as MBANDW>2M and stored in the memory of the user terminal.

It is noted that technical requirements may be generic to a service, i.e. relate to all services of particular type. For example, the bandwidth requirement may be configured as a generic technical requirement for all video services. The technical requirements may also be specific to a service. For example, a service provider may deliver to the user terminal service application software and an application profile that comprises all technical criteria for the specific service. This application profile may be invoked by the functional element any time the corresponding application is taken into use in the user terminal.

Secondly, in the embodied system the choice of applicable communication resources may be controlled via a group of non-technical search requirements. In the present embodiment the functional element retrieves part of these non-technical requirements from the memory of the user terminal and queries part of them from the user through the user interface of the terminal. The functional element generates from the requirements a set of non-technical search criteria that are also included in the access request settings.

For example, the non-technical requirements may comprise an identity of an operator that the user wishes to prefer whenever possible for its appreciated sponsorship to his favourite football team. The corresponding non-technical search criterion could be recorded as PREFOP=op1. The requirement may be stored as a generic requirement and automatically applied to any service of the user. Alternatively it may be applied to a defined group of services.

In addition, the functional element may prompt through the user interface the user to select, for example, an option from a group of possible maximum limits for cost per kilobyte. The corresponding non-technical search criterion could then be recorded as UCOST<3.

The stored non-technical requirements may be provided in a user profile that is stored in the user terminal, and invoked any time a service is initiated by the user in the user terminal. The user may be allowed to modify his or her user profile through the user interface of the user terminal.

The search criteria allow determining whether the communication resource is applicable for using the initiated service. As discussed above, the access request settings may also comprise one or more adjustable comparison criteria that enable dynamic comparisons between different applicable communication resources. The comparison criteria enable arranging communication resources that fulfil the applicable technical and/or non-technical search criteria into order of preference. Comparison criteria may be associated with a technical or a non-technical search criterion, or a characteristic of the communication resource not addressed in any of the search criteria.

For example, the user may consider that the particular requested communication instance is very important and therefore a good connection is this time essential, whatever the cost. As above, the user may input a requirement, or invoke a stored requirement to indicate preference on speed of connection over the price. The corresponding comparison criterion could be recorded as SPEED>COST. On the other hand, when a cheapest possible connection is sought after, the corresponding comparison criterion could be recorded as SPEED<COST. From a group of communication resources determined applicable on the basis of the technical and non-technical criteria, the use of this comparison criterion would result in a list topped by the resource that offers the highest transfer rate, notwithstanding the related costs.

Accordingly, in the present exemplary embodiment, access request settings generated in response to the initiated service comprise criteria:

MBANDW>2M
PREFOP=op1
UCOST<3
SPEED>COST.

Referring to FIG. 2A, the user terminal provides (step 20-1) the access request settings to the IPX proxy IPX1 via access network AN2 it is registered to. The access request settings may be included in the signaling message where the actual access request is delivered from the user terminal to the access network, or delivered separately in another signaling message. The access network forwards conventionally the access request settings to the IPX proxy (step 20-2).

In the embodiment of FIG. 2B the user is a subscriber of a home access network AN1. While moving, the user has entered an area where it is not in the coverage of the home access network AN1 but in the coverage of visited networks AN2, AN3. The user terminal sends (step 21-1) a signaling message requesting access though either or both of the access network AN2, AN3. In FIG. 2B, only the first option is illustrated. The selected access network AN2 forwards (step 21-2) conventionally the access request to the IPX proxy. When the IPX proxy receives the access request, it identifies the subscriber requesting the access and sends (step 21-3) to the home network of that subscriber an identification of the subscriber, details of the access request, and a query on criteria for respective access request settings. The query may comprise information from the access request message as such, or it may be mapped into another form, depending on the protocol applied between the IPX proxy and the home network elements.

The home access network comprises a network node configured with the functional element described in connection with FIG. 2A. In the embodiment of FIG. 2B the network node is a subscriber database. The home access network forwards (step 21-4) the query to the subscriber database that retrieves the stored subscriber data and generates therefrom a set of search and/or comparison criteria to be included in the response. The subscriber database sends (step 21-5) the response via the access network to the IPX proxy (step 21-6). The criteria provided in the response by the functional element in the subscriber database may be exhaustive, so that the IPX proxy may compile the access request settings from them. Alternatively, the IPX proxy may be configured to complement the user-specific criteria provided by the home access network with additional service specific, or IPX backbone specific criteria, and form the access request setting as a combination of them. It should be noted that the current location of the user terminal is for simplicity selected to be the same as in FIG. 2B. The location of the user terminal is not, as such, relevant for the embodiment. When the user terminal resides in the home network, the access request settings may be queried from the relevant home network node, like the subscriber database, before forwarding the request to the IPX proxy, or via a specific request by the IPX proxy, as disclosed above.

In the embodiment of FIG. 2C, the functional element is illustrated to as included in a network node in the IPX backbone network, otherwise the operations are by far similar to the ones described in FIGS. 2A and 2B. The user terminal sends (step 21-1) a signaling message requesting access though either or both of the access network AN2, AN3. The selected access network AN2 forwards (step 22-2) conventionally the access request to the IPX proxy (step 21-2). When the IPX proxy receives the access request, it identifies the subscriber requesting the access and sends (step 22-3) details of the access request, and a query on criteria for respective access request settings. The network node retrieves the relevant information, generates respective technical and non-technical search criteria and comparison criteria, as discussed above, compiles these into access request settings and forwards (step 22-4) them to the IPX proxy.

Figure 3:
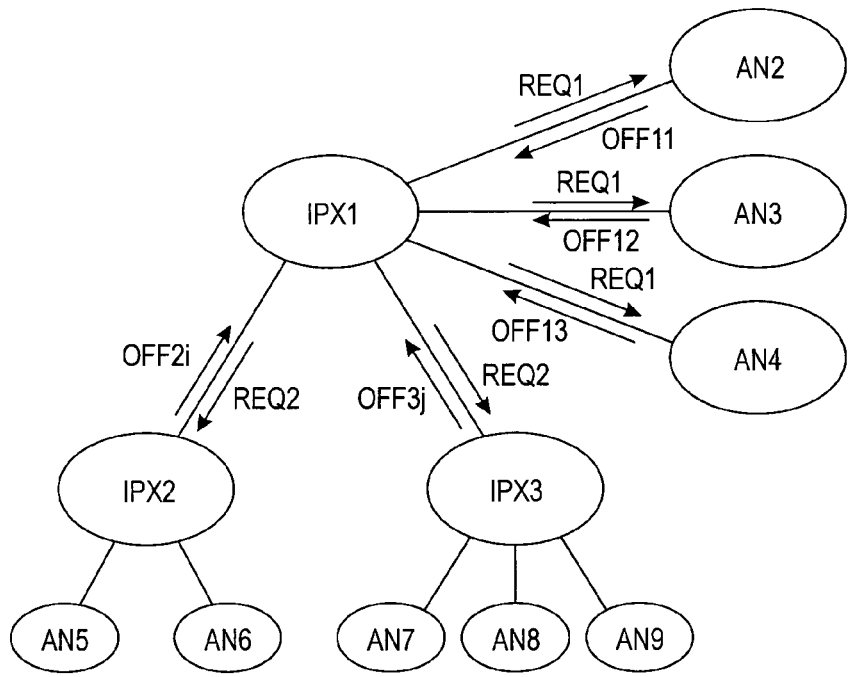
FIG. 3 illustrates the elements involved in the access resource query procedure.

FIG. 3 illustrates the elements involved in the next phases of the embodied procedure. After procedures of FIG. 2A to 2C the IPX proxy IPX1 has acquired the access request settings that comprises the search criteria for identifying communication resources applicable for implementation of the service. The search may be implemented locally or through queries. In a query, the IPX proxy IPX1 generates a query REQ1 comprising the search criteria and forwards the query to access networks AN2, AN3, AN4 under it and/or to IPX proxys IPX2, IPX3 interconnected with it.

Basically the query could be sent to every access network and IPX proxy possible, but advantageously some preliminary search criteria is used to eliminate unnecessary queries to elements that are inherently not capable of providing the queried resource. For example, the IPX proxy may, from the access request settings or from some other source, determine the location of the user. Since the operation areas of access networks are static and typically well known, a preliminary search criterion on operation area can be used to scope the queries only to access networks, or IPX proxys managing access networks that operate in the area where the user terminal currently resides. One possible alternative is that the user terminal signals to the IPX proxy the access networks it is currently able to detect, and IPX proxy forwards queries only to those access networks. Other preliminary search criteria are naturally possible. For example, a preliminary search criterion on maximum bandwidth can be used to scope queries to access networks that the IPX Proxy knows to be able to provide resources with adequate bandwidths for streaming video.

Each of the queried access networks check whether they are able to provide communication resources that match the search criteria given in REQ1 and provide their responses OFF11, OFF12, OFF13 to IPX1. In some applications, IPX1 may maintain profiles of the static, or infrequently changing characteristics of the access networks it proxies, and does not need to query these access networks at any times, or may query them with a different, trimmed list of dynamic search criteria.

In order to reach access networks under other IPX proxies, the current IPX proxy IPX1 sends a request REQ2 comprising the corresponding search criteria to IPX proxies IPX2, IPX3 interconnected to it. Again, one or more preliminary search criteria may be used to restrict the queries only to IPX proxys that operate with access networks that are currently capable of providing a communication resource that corresponds to the access query. For example, the user terminal may signal to IPX1 the access networks it is currently able to detect, IPX proxy determines the IPX proxies IPX2, IPX3 operating with these access networks and forwards queries REQ2 to them. The requests REQ1 and REQ2 both correspond to the search criteria of the access request, but they may be similar or vary to some extent from each other. Queried IPX proxys IPX2, IPX3 forward the queries to respective access networks under them and provide the received responses OFF2$i$ and OFF3$j$ to the current IPX proxy.

The responses OFF12, OFF13, OFF2$i$ and OFF3$j$ from respective access networks and/or IPX proxys comprise either a negative acknowledgement of ability to provide a communication resource according to the search criteria, or a positive acknowledgement and one or more terms associated to provision of the communication resource. The final selection of the communication resource may be performed in the IPX proxy, or in the functional element accessible to the IPX proxy or in the user terminal on the basis of the responses and the one or more comparison criteria.

Figure 4:
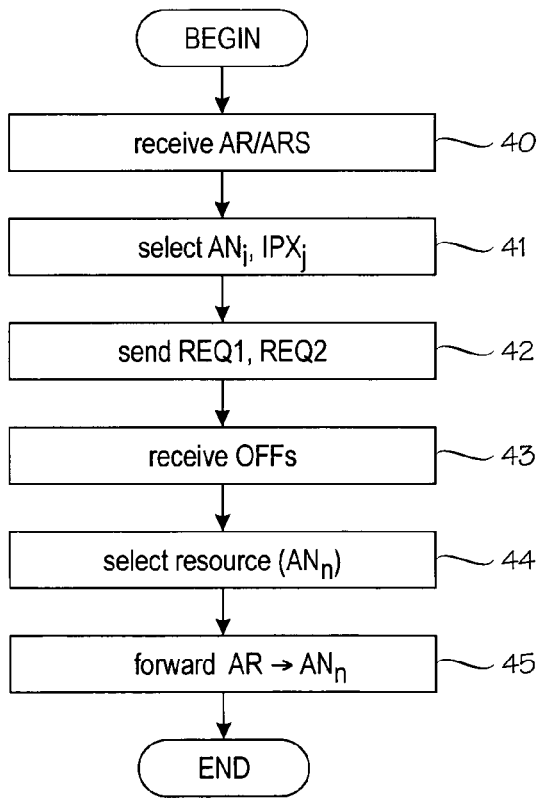
FIG. 4 illustrates steps of a procedure in a current IPX proxy of the embodied communication system

FIG. 4 illustrates the steps of a procedure for detecting and selecting a communication resource for an access request of a user terminal in a current IPX proxy of the embodied communication system. The procedure begins by the IPX proxy receiving (step 40) an access request AR and the related access request settings ARS. The reception may be, for example, a result of any of the embodiments of FIGS. 2A to 2C. The IPX proxy selects (step 41) the access nodes AN2, AN3 and IPX proxys IPX2, IPX3 to which the query on communication resources is to be sent. One or more preliminary search criteria, for example an explicit list of accessible networks provided by the user terminal, may be used in the selection. After this the IPX proxy sends (step 42) queries REQ1, REQ2 to the selected access nodes AN2, AN3 and IPX proxys IPX2, IPX3, and receives (step 43) responses OFFs from them. The query comprises information compiled on the basis of the access request settings delivered to the IPX proxy, detailing a number of parameters for which a response from the access nodes is required. The response comprises answers to the queried details. The format of the query and response messages depends on the applied protocol between the communicating entities, and implementation of such REQUEST and REPLY message formats is generally known to a person skilled in the art. For example, fielded data blocks or bitmap may be applied.

In the embodiment of FIG. 4, the functions for selecting the communication resource reside in the IPX proxy. It should be noted that the fun ctions might alternatively be provided in a functional element residing in a network node accessible to the IPX proxy, or in the user terminal. In such a case, the responses, or a pre-processed summary of the responses is delivered from IPX proxy to the respective element where the functional element and the comparing criteria reside for selection.

The responses may also comprise terms that represent conditions, which control the arrangement for provision of the communication resource. These terms may be applied with the comparison criteria to arrange the applicable communication resources into order of preference. A typical example of the term is the cost related to the resource. In the embodiment of FIG. 4, the responses by the access networks comprise a price indication for the requested communication resource. In case, for example, a range of bandwidths are possible, the indication comprises also the offered bandwidth, or a group of pairs of offered bandwidth and its or their related costs. Other terms may also be used without deviating from the scope of protection. For example, the term may comprise a condition that the requested communication resource is available but only for a defined maximum duration.

When the IPX proxy IPX1 receives the responses, it determines (step 44), on the basis of an algorithm, the best offer and selects the communication resource accordingly. Typically the selection is made using an algorithm to which the comparison criteria, details of the applicable communication resources and/or respective terms are fed. The best offer is selected on the basis of the conditions included in the algorithm. As discussed above, the terms of the conditions of the algorithm may be dynamically adjusted for each user by providing the access request settings, which comprise the one or more non-technical search criteria and comparison criteria. Some other decision making mechanism may, however, be used without deviating from the scope of protection.

For example, continuing the above embodiment, the access request settings comprised search criteria for MBANDW>2M
PREFOP=op1
UCOST<3
SPEED>COST Let us assume, that as a result of the query, the IPX proxy has three valid responses. The first valid response is from AN3 and offers a bandwidth of 2M with a unit cost of 1. The second response is from AN6 of IPX2 and offers a bandwidth of 4M with a unit cost of 3. The third response is from AN9 of IPX3 and also offers a bandwidth of 2M with unit cost of 1. All these fulfil the technical criterion for bandwidth (MBANDW) and the non-technical search criterion for unit cost (UCOST). On the basis of these search criteria, the offers of AN3 and AN9 would be equal and either one could be selected. However, if AN3 is operated by the preferred operator op1 and AN9 by some other operator, due to the further non-technical search criterion for preferred operator (PREFOP), the communication resource offered by AN3 would be selected. The further adjustment by the comparison criteria SPEED>COST would mean that the algorithm's preliminary condition on cheapest offer could be overrun by the requirement of preferring speed of connection over cost. This would mean that the offer of AN6 from IPX2 would be selected.

As a further aspect of the embodiment, IPX proxy may be arranged to first evaluate the responses, and if the indicated price or other terms are not in line with one or more predefined conditions of the algorithm or criteria in the access request settings, to send a counter offer to one or more parties that responded to the first query. IPX proxy may further be arranged to forward the responses to the functional element in the home access network of the user, or in the user terminal and facilitate direct negotiation of the terms between the user terminal and the access network. The facilitation may be implemented as a secured connection between the user terminal and the respective network node in the selected access network.

In the basic embodiment, when the communication resource and the corresponding access network have been selected, the IPX proxy forwards (step 45) the access request AR to the selected access network $AN_n$, and a procedure for setting up a connection using the selected communication resource may begin.

The algorithm may alternatively be arranged to determine, for each of the offered responses an order of preference, and provide a list of offers, arranged into the order of preference, to the user that performs the final selection through the user interface of the user terminal.

The above procedure enables the user to locate and select communication resources to fulfill the dynamically changing access needs and optimize the selection of the resource according to an adjustable combination of technical and non-technical, dynamic and static selection conditions. This dynamic arrangement significantly alleviates the arrangements and operations necessary between the operators of the access networks to arrange well opersting, seamless roaming conditions for users with greatly and dynamically varying communication resource requirements.

Depending on the embodiment, the setting up of the connection using the selected communication connection may continue in various ways. In case the selected access node is one under the IPX proxy, the setup may be performed conventionally, in a manner well known to a person skilled in the art. In case the selected communication resource is offered by an access node under another IPX proxy, and additional procedure can be used to determine the roles and responsibilities between the IPX proxies. For example, let us assume, that a communication resource in AN9 is the best offer and therefore becomes selected.

Figure 5:
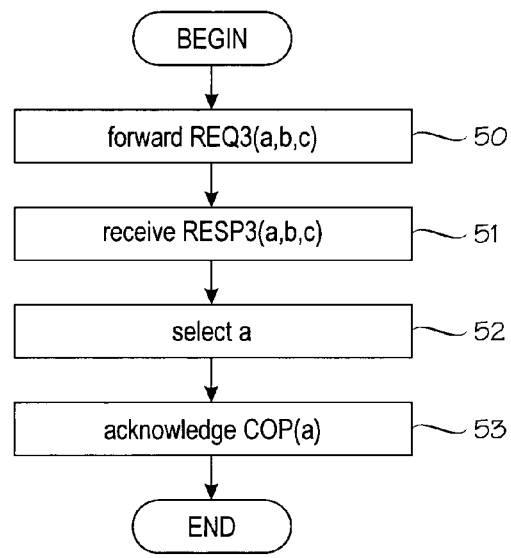
FIG. 5 illustrates the steps of a procedure for dynamic adjustment of negotiating the roles and responsibilities in a current IPX proxy; and The block diagrams in FIG. 6 show reference hardware configurations of an embodied user terminal and network node.

FIG. 5 illustrates the steps of a procedure for dynamic adjustment of negotiating the roles and responsibilities in a current IPX proxy of the embodied communication system. The steps in the other party of the procedure are clear to a person skilled in the art on the basis of the description of FIG. 5. The procedure begins by the current IPX proxy IPX1 selecting the communication resource of AN9 of IPX3. IPX1 generates a request REQ3 comprising definitions on two or more levels of operation options for IPX2 and a query on costs related to each of these operation options. The operation options define the level of responsibility regarding could be, for example:

a) IPX2 acts as a proxy and sells connection to the access network
b) IPX1 is responsible of user management, IPX2 sells the communication resource to IPX1
c) IPX2 handles user management, resource management and has a service level agreement with IPX1.

In step 50, the current IPX proxy IPX1 sends the request REQ3 to the selected IPX proxy IPX2 that returns a response RESP3 comprising cost information related to each of these operation options (step 51) for cooperation. The current IPX proxy IPX1 comprises an algorithm that is configured to compute, on the basis of the communication resource in question, and of the operation options and their corresponding costs, feasibility for each of the options. Implementation of such simple algorithms is well known to a person skilled in the art. On the basis of the computed feasibility, IPX1 selects (step 53) an option a) that provides the most feasible configuration for cooperation between IPX1 and IPX2, and acknowledges to IPX2 co-operation according to this selected option COP(a) (step 53).

Through this arrangement, operator of the IPX proxy can ensure that the broker operation between user terminals and communication resource providers may be implemented as feasibly as possible, without compromising the needs of the user.

Above, the IPX proxy has been shown as configured to perform the above operations whenever it receives an indication therefore from the user terminal or from the home access network of the user terminal. Alternatively, the IPX proxy may first check whether it has an effective agreement to manage the access requests of the user or whether it should first agree on the terms of the management before implementing the related tasks. The management may be provided in several different levels and in a further embodiment of the invention, the IPX proxy is, in response to a received access request (cf. steps 20-2 or 21-2 of FIG. 2), configured to identify two or more service level options for managing the user and send an offer comprising these service level options and their respective prices to the functional element in the user terminal, or in the home access network. The options can comprise, for example:

1. The current IPX proxy only proxys the traffic
2. The current IPX proxy manages network resources and proxys service level agreements.
3. The current IPX proxy manages service level agreements to communication resource requesters and providers and their respective negotiations.

The offer may be accepted according to one of these options, or a procedure including one or more counteroffers may be implemented before the management agreement is finalized by acceptance or rejection.

Figure 6:
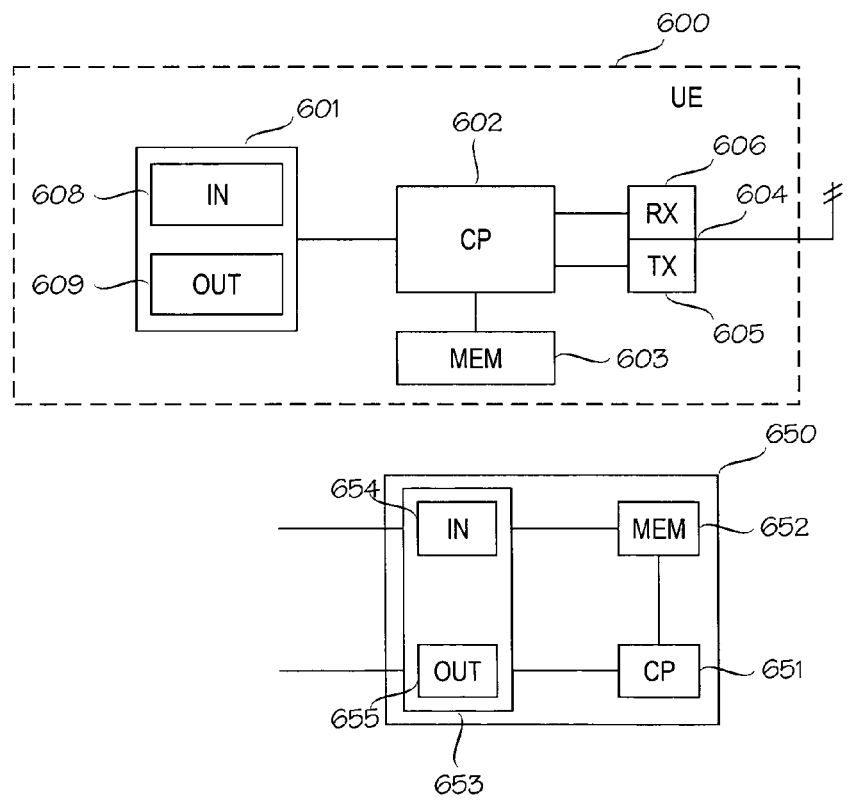

The block diagrams in FIGS. 6A and 6B show reference hardware configurations of an embodied user terminal and network node according to the invention. The user terminal is embodied here with a mobile station. The mobile station 600 of FIG. 6A comprises a processing unit 602 for performing systematic execution of operations upon stored and/or received data. The processing unit 602 is a central element that essentially comprises an arithmetic logic unit, a number of special registers and control circuits. For example, the functions implemented by the processing unit 602 in transmission typically comprise: encoding, reordering, interleaving, scrambling, channel multiplexing, and burst building.

The mobile station comprises also a memory unit 603, data medium where computer-readable data or programs, or user data can be stored. The mobile station comprises also a transceiver unit 604 that includes at least a transmitter 605 and a receiver 606. The transmitter 605 receives a bitstream from the processing unit 602, and converts it to a radio signal for transmission by the antenna 607. Correspondingly, the radio signals received by the antenna 607 are led to the receiver 606, which converts the radio signal into a bitstream that is forwarded for further processing to the processing unit 602.

The mobile station also comprises an interface unit 601 with at least one input unit 608 for inputting data for internal processing in the mobile station, and output unit 609 for outputting data from the internal processes of the mobile station. Said interface unit may comprise interfaces to hardware and software that is integrated, attached or attachable to the mobile station. Examples of such comprise application programs, as well as user interface elements, like a keypad, a screen, a touch screen, a microphone, a loudspeaker, and equals.

The processing unit 602, memory unit 603, interface unit 601 and transceiver unit 604 are electrically interconnected to provide means for performing systematic execution of operations on the received and/or stored data according to the predefined, essentially programmed processes of the mobile station. In the described embodiments according to the invention, the operations may comprise a functional element, or part of the functional element, formed by functions of the user terminal in searching and/or selecting a communication resource to implement a communication service. These operations are described in more detail with FIGS. 2A to 2C. FIG. 6A shows logical components of the user terminal, and the referred means may comprise functions of one of the presented units or may be implemented as a combination of the functions of the presented units.

The network element of FIG. 6B embodies, for example, a database element of an access network or a network node of an IPX backbone. The network element comprises a processing unit 651, an element that includes at least an arithmetic logic function, a number of special registers and control circuits. Connected to the processing unit is a memory unit 652, a data medium where computer-readable data or programs or user data can be stored. The network element further comprises an interface block 653 with input unit 654 for inputting data for internal processing in the element, and output unit 655 for outputting data from the internal processes of the element. Examples of said input unit comprise a plug-in unit acting as a gateway for information delivered to its external connection points. Examples of said output unit include plug-in unit feeding information to the lines connected to its external connection points.

The processing unit 651, memory unit 652, and interface block 653 are electrically interconnected to provide means for performing systematic execution of operations on the received and/or stored data according to the predefined, essentially programmed processes of a network node. In the described embodiments according to the invention, the operations may comprise a functional element, or parts of the functional element, formed by functions of the IPX proxy or subscriber database in the home access network. These operations are described in more detail with FIGS. 2A to 2C, and FIGS. 3 to 5. FIG. 6B shows logical components of the network element, and the referred means may comprise functions of one of the presented units or may be implemented as a combination of the functions of the presented units.

It will be obvious to a person skilled in the art that, as the technology advances, the inventive concept can be implemented in various ways. The invention and its embodiments are not limited to the examples described above but may vary within the scope of the claims.

The invention claimed is:

1. A method for managing a request on a communication resource for a user terminal, comprising:
    detecting an access request on a communication resource for a user terminal; determining access request settings that comprise a user-specific set of one or more selection criteria for estimating applicability of a communication resource for the requested access; querying communication resources from a group of access nodes;
    using the determined access request settings in selecting the communication resource for the access; and querying the communication resources by a proxy server whose client the user terminal is, wherein another proxy server responds with one or more terms of operation, a term defining a share of management responsibilities between the two proxies, wherein different terms are associated with a different price for one communication resource.

2. A method according to claim 1, further comprising determining the access request settings in the user terminal.

3. A method according to claim 2, further comprising the access request settings by querying parameters for the settings from the user though the user interface.

4. A method according to claim 2, further comprising determining the access request settings by retrieving parameters from the memory of the user terminal.

5. A method according to claim 1 further comprising determining the access request settings by retrieving parameters for the settings from a database of the proxy server whose client the user terminal is.

6. A method according to claim 1, further comprising maintaining subscriber information of the user in a home network subscriber database, and determining the access request settings by retrieving parameters for the settings from the subscriber database.

7. A method according to claim 1, further comprising the user-specific set of one or more selection criteria comprises a selection criterion of at least one of the following types: user-specific technical criterion, user-specific non-technical criterion, user-specific comparison criterion.

8. A method according to claim 1, further comprising:
the proxy determining access nodes presently available to the user terminal; and
the proxy querying communication resources from the determined access nodes.

9. A method according to claim 1, wherein at least one access node is managed by the other proxy server, and further comprising sending a query for the communication resource by the proxy server to the other proxy server.

10. A network node for a telecommunication system, comprising:
an interface unit for receiving an information on an access request for a user terminal;
a control unit, the functions of the control unit being at least partially controlled by program code, said program code executed on a terminal comprising program code configuring said network node to
determine access request settings that comprise a user-specific set of one or more selection criteria for estimating applicability of a communication resource for the requested access;
query communication resources from a group of access nodes;
use the determined access request settings in selecting the communication resource for the access;
query the communication resources by a proxy server whose client the user terminal is; and
receive a response by another proxy server, the response comprising one or more terms of operation, a term defining a share of management responsibilities between the two proxies, wherein different terms are associated with a different price for one communication resource.

11. A network node according to claim 10, wherein the network node is a subscriber database element and comprises:
a memory unit for storing a user-specific set of one or more selection criteria for determining applicability of a communication resource for the requested access;
said program code further comprising program code configuring said network node to;
receive a query on the user-specific set of one or more selection criteria from the proxy server whose client the user terminal presently is;
retrieve the user-specific set of one or more selection criteria from the memory unit; and
respond to the query by sending the retrieved user-specific set of one or more selection criteria to the proxy server.

12. A network node according to claim 10, wherein the network node is the proxy server, said program code further comprising program code configuring said network node to
receive an access request from a user terminal;
send a query on the user-specific set of one or more selection criteria to a subscriber database in the home network of the user.

13. A network node according to claim 12, wherein said program code further comprising: program code configuring said network node to extract the user-specific set of one or more selection criteria, included to the access request by the user terminal, from the received access request.

14. A network node according to claim 12, wherein y the user-specific set of one or more selection criteria comprises a criterion of at least one of the following types: user-specific technical criterion, user-specific non-technical criterion, user-specific comparison criterion.

15. A network node according to claim 12, wherein said program code further comprises:
program code configuring said network node to determine access nodes presently available to the user terminal; and
program code configuring said network node to query communication resources from the determined access nodes.

16. A network node according to claim 10, wherein the network node is the proxy server, comprising
a memory unit for storing a user-specific set of one or more selection criteria for determining applicability of a communication resource for the requested access;
said program code further comprising program code configuring said network node to
receive an access request from a user terminal;
retrieve the user-specific set of one or more selection criteria from the memory unit.

17. A network node according to claim 10, wherein said program code further comprises program code configuring said network node to send a query for the communication resource to another proxy server that manages at least one access node.

18. A network node according to claim 10, wherein said program code further comprises:
program code configuring said network node to receive responses from the group of access nodes;
program code configuring said network node to send the responses, or information compiled from the responses, to the user terminal; and
program code configuring said network node to receive indication on the selected communication resource from the user terminal.

19. A user terminal for a telecommunication system, comprising
an interface unit for receiving an information on an access request on a communication resource for a user terminal;
a control unit, the functions of the control unit being at least partially controlled by program code, said program code comprising:
program code configuring said user terminal to detect an access request for a communication resource;
program code configuring said user terminal to determine access request settings that comprise a user-specific set of one or more selection criteria for estimating applicability of a communication resource for the requested access;

program code configuring said user terminal to receive information on communication resources in a group of one or more access nodes;

program code configuring said user terminal to select a communication resource on the basis of the access request settings; and program code configuring said user terminal to send the access request settings to a proxy server whose client it presently is, wherein another proxy server responds with one or more terms of operation, a term defining a share of management responsibilities between the two proxies, wherein different terms are associated with a different price for one communication resource.

20. A user terminal according to claim 19, wherein said program code further comprises:

program code configuring said user terminal to receive from the proxy server information on available communication resources in a group of one or more access nodes.

21. A non-transitory computer-readable medium having stored thereon a software routine, comprising:

detecting an access request comprising a request for a communication resource for a user terminal;

determining access request settings that comprise a user-specific set of one or more selection criteria for estimating applicability of a communication resource for the requested access;

querying communication resources from a group of access nodes;

using the determined access request settings in selecting the communication resource for the access; and querying the communication resources by a proxy server whose client the user terminal is, wherein another proxy server responds with one or more terms of operation, a term defining a share of management responsibilities between the two proxies, wherein different terms are associated with a different price for one communication resource.

* * * * *